United States Patent [19]

Sendelweck et al.

[11] Patent Number: 5,202,763
[45] Date of Patent: Apr. 13, 1993

[54] TELEVISION RECEIVER WITH PARTIALLY BY-PASSED NON-LINEAR LUMINANCE SIGNAL PROCESSOR

[75] Inventors: Gene K. Sendelweck; Roger L. Lineberry, both of Indianapolis, Ind.

[73] Assignee: Thomson Consumer Electronics, Inc., Indianapolis, Ind.

[21] Appl. No.: 695,804

[22] Filed: May 6, 1991

[51] Int. Cl.$^5$ ........................................... H04N 5/208
[52] U.S. Cl. .................................... 358/166; 358/31; 358/39
[58] Field of Search ................. 358/168, 39, 166, 37, 358/36, 31

[56] References Cited

U.S. PATENT DOCUMENTS

| | | | |
|---|---|---|---|
| 2,760,008 | 8/1956 | Schade | 330/99 |
| 4,365,266 | 12/1982 | Lagoni | 358/31 |
| 4,489,349 | 12/1984 | Okada | 358/168 |
| 4,638,351 | 1/1987 | Clarke | 358/31 |
| 5,079,633 | 1/1992 | Hagino et al. | 358/36 |
| 5,081,450 | 1/1992 | Lucas et al. | 340/728 |

FOREIGN PATENT DOCUMENTS 0278967 11/1990 Japan .

*Primary Examiner*—Victor R. Kostak
*Assistant Examiner*—Jeffrey S. Murrell
*Attorney, Agent, or Firm*—Joseph S. Tripoli; Peter M. Emanuel; Richard G. Coalter

[57] ABSTRACT

A composite video input signal is separated into luminance and chrominance components by a signal separation filter and the components are applied to a display processor having a video display device coupled thereto for providing displayed images. For enhancement of detail in dark and light areas of the displayed images, the luminance signal is coupled to the display processor via a non-linear luminance signal processor which provides additional amplification in the dark and light areas but tends also to degrade the signal to noise ratio in those areas. To avoid a loss of signal to noise ratio in the enhanced areas the receiver includes a by-pass circuit for by-passing high frequency components of the luminance signal around the non-linear luminance signal processor and a filter in the non-linear luminance signal processor for attenuating the high frequency components.

4 Claims, 2 Drawing Sheets

TELEVISION RECEIVER WITH PARTIALLY BY-PASSED NON-LINEAR LUMINANCE SIGNAL PROCESSOR

FIELD OF THE INVENTION

The present invention relates to television receivers and particularly to television receivers employing non-linear processing of luminance signal for enhancing detail in dark and/or light areas of displayed images.

BACKGROUND OF THE INVENTION

Video processing circuits providing enhanced detail in dark or light areas of displayed images are known. O. H. Shade, for example, describes such a processing circuit in U.S. Pat. No. 2,760,008 entitled AMPLIFIER HAVING CONTROLLABLE SIGNAL EXPANSION AND COMPRESSION CHARACTERISTICS which issued Aug. 30, 1956. The Shade processor includes so-called "black stretch" and "white stretch" non-linear processing circuits which provide enhanced visibility of picture detail in darker and lighter areas of displayed images. This is achieved by varying the amplification of the luminance signal as a function of the luminance signal level. For example, to improve detail in darker areas of a picture (hereafter, "black stretch" signal processing) the luminance signal is applied to a non-linear amplifier having a relatively higher gain for input signal levels in a range below about 50 IRE units. Similarly, improved detail brighter areas of a picture (hereafter, "white stretch" signal processing) increased gain is applied for input signals in a range above 50 IRE units.

Another example of non-linear luminance signal processing wherein a luminance signal is subjected to different degrees of amplification in different signal level ranges is described by T. Okada in U.S. Pat. No. 4,489,349 entitled VIDEO BRIGHTNESS CONTROL CIRCUIT which issued Dec. 18, 1984. The Okada apparatus includes a non-linear video processing circuit which provides variable gamma correction of luminance signal and in which the value of gamma is automatically determined by a control signal provided from an APL (average picture level) detector.

SUMMARY OF THE INVENTION

The present invention resides in part in the discovery of a new problem concerning non-linear luminance signal processing of a type where a luminance signal is subjected to higher amplification in some signal amplitude (brightness) ranges than in others. This newly discovered problem concerns the spatial distribution of noise in displayed images and is somewhat elusive in that it depends, among other things, on the video signal sources available to a specific viewer.

In more detail, it is herein recognized that when a video signal is "stretched" (i.e., disproportionately amplified) in a particular IRE signal level range, the noise in that range is increased proportionately relative to the noise in other portions of the picture. The visual effect is that for input signals having poor signal to noise ratios there is a non-uniform distribution of noise in displayed images resulting in a "patchy" appearing picture having clear and fuzzy visual areas. This effect is not likely to be noticed by a viewer having low noise signal sources (e.g., an urban viewer or one having cable or satellite TV access) but is likely to be observable to viewers in TV "fringe areas" where noise may represent a significant portion of received signals. Another example of a situation where the "non-uniform noise distribution effect" or "patchy picture" effect may be manifested is where the viewer is using as a signal source a VCR that is out of adjustment or in need of head cleaning or the case of a satellite viewer whose antenna is missdirected.

One might consider that the "patchy picture" problem described above might be solved by simply disabling the non-linear processing when the input signal is of poor signal to noise ratio. Indeed, this solution will solve the "patchy picture" problem but only at the cost of loss of detail in the stretched picture areas.

It is an object of the present invention to solve the "patchy picture" problem without disabling the non-linear processing.

A television receiver embodying the invention includes a signal separation filter for separating a composite video input signal supplied thereto into a luminance component and a chrominance component. A display processor is provided, having a chrominance signal input coupled to receive the chrominance component, having a luminance signal input coupled via a non-linear signal processor to receive the luminance signal component and having an output coupled to a display device for displaying images having enhanced detail in luminance signal level ranges determined by the non-linear luminance signal processor. A first circuit means, connected in parallel with the non-linear luminance signal processor, by-passes high frequency components of the luminance component around the non-linear luminance signal processor. A second circuit means, coupled to the non-linear luminance signal processor, attenuates high frequency components of the luminance component processed by the non-linear luminance signal processor.

BRIEF DESCRIPTION OF THE DRAWING

The invention is illustrated in the accompanying drawing wherein like elements are denoted by like reference designators and in which.

DETAILED DESCRIPTION

Figure 1:
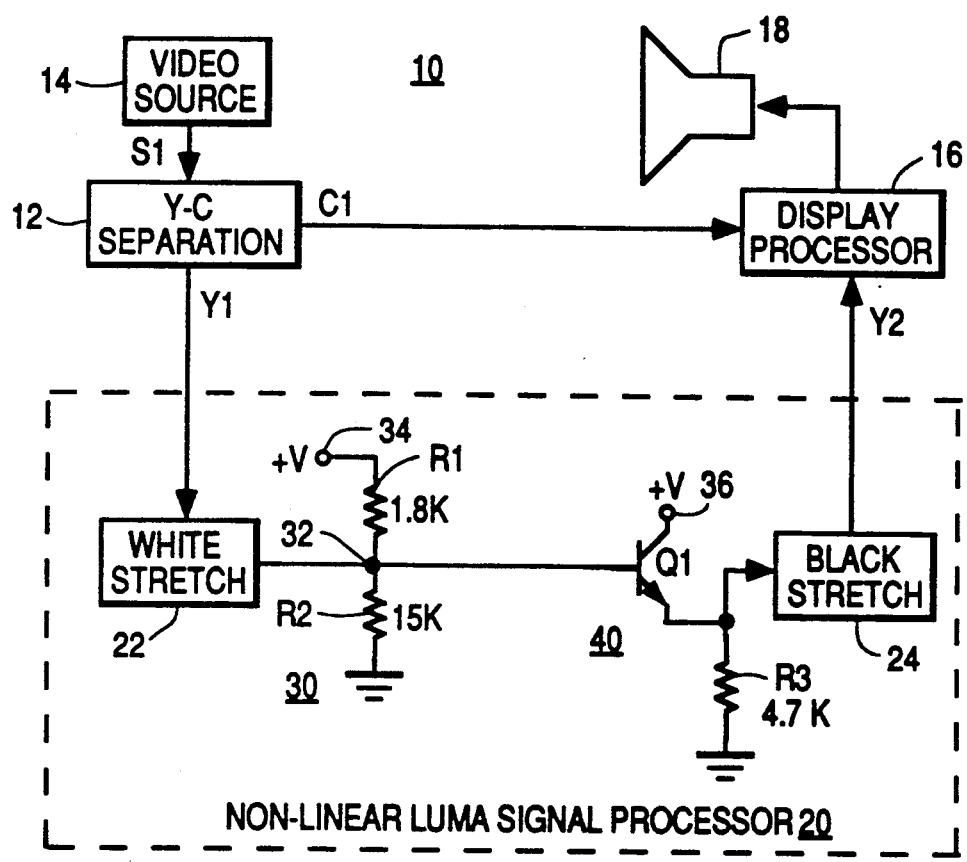
FIG. 1 is a block diagram, partially in schematic form, of a prior art television receiver employing black stretch and white stretch non-linear luminance signal processing.

It is helpful to an understanding of the present invention to briefly review an example of a known receiver having both black stretch and white stretch non-linear video signal processing. FIG. 1 is exemplary of a model CTC-169 color television receiver manufactured by Thomson Consumer Electronics having such features. The receiver 10 includes a chrominance/luminance signal separation filter 12 which provides the function of separating a composite video input signal S1 supplied thereto from a video source 14 into a chrominance component C1 and a luminance component Y1.

The receiver further includes a display processor 16 having a chrominance signal input coupled to receive the chrominance component C1, having a luminance signal input coupled via a non-linear luminance signal processor 20 (outlined in phantom) to receive the luminance component provided by filter 12 after being subjected to non-linear processing in unit 20. An output of the display processor 16 is coupled to a display device 18 (e.g., a kinescope) for displaying images having enhanced detail in luminance signal level ranges determined by the non-linear luminance signal processor 20.

The processor 20 comprises a cascade connection of a white stretch luminance signal processor 22 coupled in cascade with a black stretch luminance signal processor 24 between the luminance signal output of separation filter 12 and the luminance signal input of display processor 16. For purposes of explanation of features of the present invention later, the specific coupling circuitry between the black and white stretch processing is shown and comprises a resistive load network 30 which serves as an output load for white stretch processor 22 and an emitter follower 40 which couples the white stretched signal appearing at the output node 32 of the load network 30 to the input of the black stretch processor 24. Load network 30 comprises resistors R1 and R2 coupled between node 32 and respective ones of a positive supply terminal 34 and a source of reference potential (e.g., ground). Emitter follower 40 comprises an NPN transistor Q1 connected in a common emitter configuration having a base electrode coupled to node 32, a collector electrode coupled to a source 36 of positive supply voltage +V and having an emitter electrode coupled to a source of reference potential (e.g., ground) via an emitter load resistor R1 and coupled to the input of the black stretch luminance signal processor 24.

In operation, the chrominance signal C1 and the non-linearly processed luminance signal Y2 are processed by display processor 16 and displayed on kinescope 18 to provide images having improved detail in lighter and darker picture areas due to the white stretch and black stretch processing provided by non-linear processor 20. As previously explained, noise which may accompany the video input S1 will be subjected to amplification in the non-linear processor in the "stretched" areas of the picture. This noise effect will, generally speaking, not be particularly objectionable in cases where the input signal S1 is of a relatively poor signal to noise ratio the amplification of the noise in the "stretched" picture areas may become visible and will be manifested as a "patchy" appearing picture in which some displayed areas (the stretched areas) are more noisy than other areas.

Figure 2:
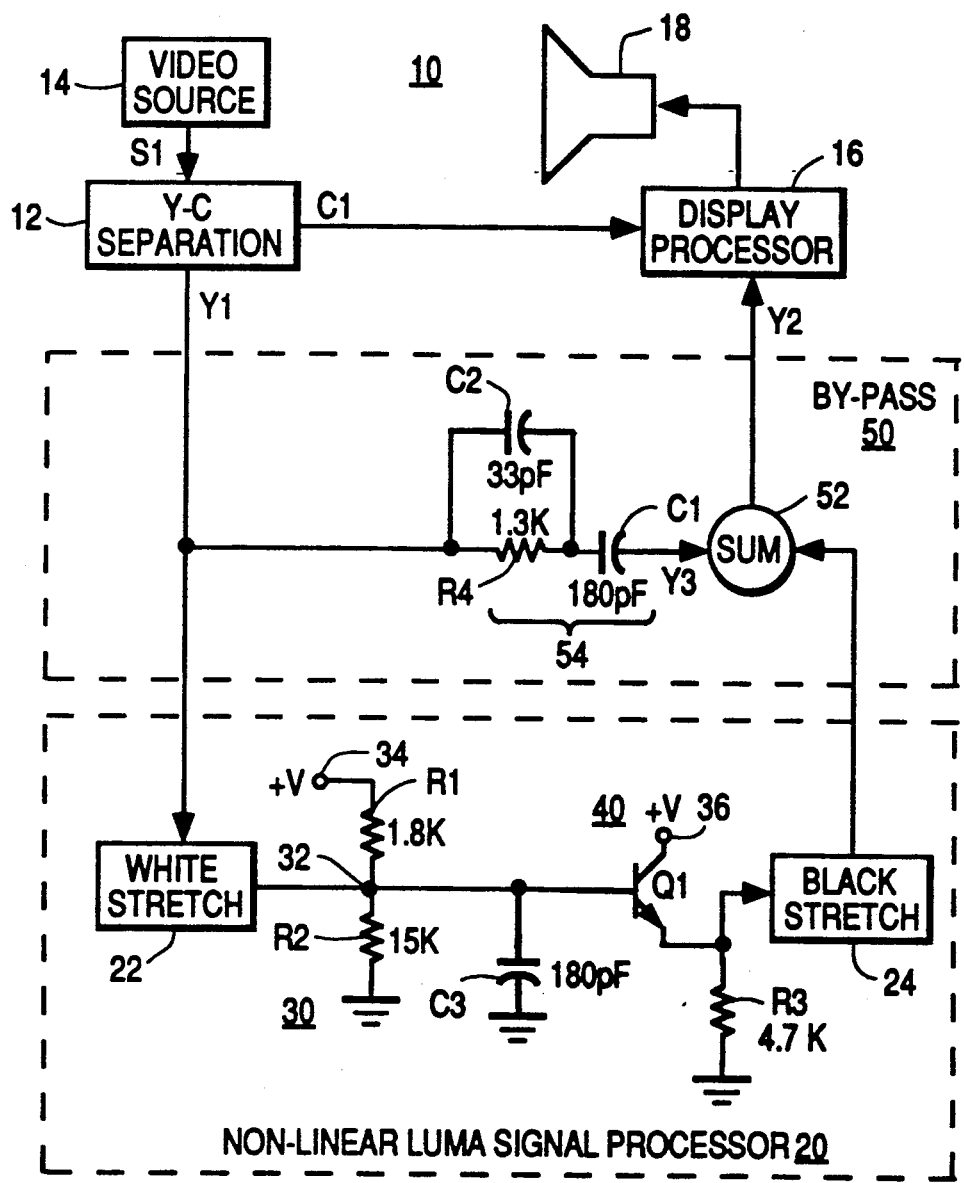
FIG. 2 is a block diagram, partially in schematic form, illustrating modifications to the receiver of FIG. 1 embodying the invention for solving the "patchy picture" problem.

The foregoing problem is solved in the embodiment of the invention shown in FIG. 2 by a combination of two circuit means. The first of these circuit means comprises a frequency selective by-pass circuit 50 which is connected in parallel with the non-linear luminance signal processor 20 for by-passing high frequency components of the luminance signal component Y1 around the non-linear luminance signal processor 20. The second of these circuit means, described later, provides the function of attenuating high frequency components of the luminance signal component processed by the non-linear luminance signal processor 20.

By-pass circuit 50 comprises a summing circuit 52 having a first input coupled to receive the non-linearly processed luminance signal Y2 provided by processor 20, having a second input coupled via a high pass filter 54 to receive the luminance signal Y1 and having an output coupled to supply the sum (Y2') of the high pass filtered luminance signal Y3 and the non-linearly processed signal Y2 to the display processor 16. The high pass filter 54 comprises a series connection of a resistor R4 and a Capacitor C1. For the exemplary element values shown in the drawing, this filter has a "corner" frequency of about 680 KHz. As an optional feature of the invention the resistor R4 of the high pass filter 54 may be partially by-passed for high frequencies by a peaking capacitor C2 as shown. For the exemplary values shown, this capacitor in combination with resistor R4 provides peaking in the luminance signal band at a frequency of about 3.7 MHz. Capacitor C2 may be omitted where such peaking is not desired.

The second circuit means, which attenuates high frequency components of the luminance signal processed by non-linear processor 20 comprises a capacitor C3 connected between node 32 of the resistive load 30 of white stretch processor 22 and ground thereby forming a low pass filter in combination with the load network 30. The value of capacitor C3 is selected with respect to the equivalent resistance of resistors R1 and R2 to provide a low-pass filter corner frequency substantially the same as the corner frequency of the high pass filter 54 in by-pass circuit 50.

In operation, the non-linear white stretch and black stretch processing is applied only to low frequency components of the luminance signal Y1 due to the attenuation of high frequencies provided by the low-pass filter (R1, R2, C3) in the non-linear luminance signal processor. The high frequencies that are not subjected to non-linear processing are by-passed around the non-linear processor 20 by by-pass circuit 50. As a result, high frequency luminance signal components are not subjected to increased amplification and so appear less noisy than would be the case if they were subjected to stretching.

Visually, the high frequency noise components present a uniform non-patchy distribution in displayed images and the effect of noise amplification is confined only to low frequency noise components. For the specific embodiment shown, with a corner frequency for both filters selected to be approximately in the 550 KHz range, it was found that a signal to noise improvement of about 3.6 dB was obtained with both of the white stretch and black stretch circuits operating. Expressed another way, the visual effect is somewhat similar to that obtained when a coring circuit is being used. It is also adaptive, in that high stretch levels result in higher levels of signal to noise ratio improvement (or, more properly stated, to less signal to noise ratio degradation by the stretch circuits).

There has been shown and described herein a television system having improved detail in light and dark picture areas and which substantially reduces the non-uniform noise distribution effect previously described. Various changes may be made within the scope of the invention as defined in the appended claims. The filters, for example, may be implemented with resistor-inductor elements (RL) rather than resistor-capacitor (RC) elements in receivers employing digital processing. Also the low-pass filtering may precede all of the non-linear processing rather than being "embedded" with it as shown in the exemplary embodiment. An advantage of "embedded" filtering (between the white and black stretch circuits) is that a low-pass filter can be formed by simply adding one capacitor to the existing receiver circuits at the load of the white stretch circuit for the embodiment shown.

What is claimed is:

1. A television receiver, comprising:

a signal separation filter for separating a composite video input signal supplied thereto into a luminance component and a chrominance component;

a display processor having a chrominance signal input coupled to receive said chrominance component, having a luminance signal input coupled via a non-linear luminance signal processor to receive said luminance signal component and having an output coupled to a display device for displaying images having enhanced detail in luminance signal level ranges determined by said non-linear luminance signal processor, said non-linear luminance signal processor being of a type having relatively increased gain within a predetermined amplitude range between black level and white level;

characterized in that for reducing a tendency of said non-linear luminance signal processor to accentuate differences in displayed picture noise levels under relatively low input signal-to-noise ratio conditions, said receiver further comprises:

a signal summing circuit having an output coupled to said luminance signal input of said display processor and having first and second inputs;

a high-pass filter for coupling said luminance component to said first input of said signal summing circuit;

said non-linear luminance signal processor being coupled between an output of said signal separation filter and said second input of said signal summing circuit; and a low-pass filter disposed in said non-linear luminance signal processor so that a processed luminance signal produced by said signal summing circuit is representative of a sum of a linearly processed high frequency component and a non-linearly processed low frequency component thereby reducing said tendency of said non-linear processor to accentuate said differences in said displayed picture noise levels under said relatively low input signal-to-noise ratio conditions.

2. A television receiver as recited in claim 1 wherein:
said high pass filter has a given corner frequency; and said low pass filter has a corner frequency substantially equal to said given corner frequency of said high pass filter.

3. A television receiver as recited in claim 2 wherein:
said high pass filter further comprises peaking means coupled thereto for applying peaking to high frequency components of said luminance component coupled to said signal summing circuit by said high pass filter.

4. A television receiver, comprising:
a signal separation filter for separating a composite video input signal supplied thereto into a luminance component and a chrominance component;

a display processor having a chrominance signal input coupled to receive said chrominance component, having a luminance signal input coupled via a non-linear luminance signal processor to receive said luminance signal component and having an output coupled to a display device for displaying images having enhanced detail in luminance signal level ranges determined by said non-linear luminance signal processor;

first circuit means connected in parallel with said non-linear luminance signal processor for by-passing high frequency components of said luminance component around said non-linear luminance signal processor;

second circuit means in said non-linear luminance signal processor for attenuating high frequency components of said luminance component processed by said non-linear luminance signal processor;

said first circuit means comprising a high pass filter having a given corner frequency;

said second circuit means comprising a low pass filter having a corner frequency substantially equal to said given corner frequency; and wherein:

said non-linear luminance signal processor comprises first and second non-linear processors coupled in cascade by a buffer amplifier, said first non-linear processor having a predetermined load impedance and said second circuit means comprises a capacitor coupled between said load impedance and a source of reference potential.

* * * * *